US012266339B2

(12) United States Patent
Ono

(10) Patent No.: US 12,266,339 B2
(45) Date of Patent: Apr. 1, 2025

(54) CORRECTION METHOD OF SYNTHESIZED SPEECH SET FOR HEARING AID

(71) Applicant: SPACE LIVE. Inc., Tokyo (JP)

(72) Inventor: Hiroshi Ono, Tokyo (JP)

(73) Assignee: SPACE LIVE. Inc., Tokyo (JP)

( * ) Notice: Subject to any disclaimer, the term of this patent is extended or adjusted under 35 U.S.C. 154(b) by 309 days.

(21) Appl. No.: 17/760,256

(22) PCT Filed: Feb. 7, 2020

(86) PCT No.: PCT/JP2020/004766
§ 371 (c)(1),
(2) Date: Aug. 5, 2022

(87) PCT Pub. No.: WO2021/157052
PCT Pub. Date: Aug. 12, 2021

(65) Prior Publication Data
US 2023/0038118 A1 Feb. 9, 2023

(51) Int. Cl.
*G10L 13/02* (2013.01)
*G10L 13/08* (2013.01)
*H04R 25/00* (2006.01)

(52) U.S. Cl.
CPC .............. *G10L 13/02* (2013.01); *G10L 13/08* (2013.01); *H04R 25/505* (2013.01)

(58) Field of Classification Search
CPC ........ G10L 13/02; G10L 13/08; H04R 25/505
See application file for complete search history.

(56) References Cited

U.S. PATENT DOCUMENTS 4,454,609 A * 6/1984 Kates .................. G10L 21/0364
704/E21.009
4,802,228 A * 1/1989 Silverstein .......... G10L 21/0364
704/E21.009

(Continued)

FOREIGN PATENT DOCUMENTS

JP    S58-079400 A    5/1983
JP    H07-039540 A    2/1995

(Continued)

OTHER PUBLICATIONS

International Search Report issued in PCT/JP2020/004766; mailed Apr. 28, 2020.

*Primary Examiner* — Eric Yen
(74) *Attorney, Agent, or Firm* — Studebaker Brackett PLLC

(57) ABSTRACT

A method for correcting a synthesized speech set for hearing aid according to an aspect of the present invention includes the steps of outputting first synthesized speech for testing on the basis of first synthesized speech data for testing correlated with a first phoneme label in a synthesized speech set for testing, accepting a first answer selected by a user, outputting second synthesized speech for testing on the basis of second synthesized speech data for testing correlated with a second phoneme label in the synthesized speech set for testing, accepting a second answer selected by the user, and correlating first synthesized speech data for hearing aid with the second phoneme label instead of second synthesized speech data for hearing aid in a synthesized speech set for hearing aid, in a case in which the first answer matches the second phoneme label and also the second answer does not match the second phoneme label.

13 Claims, 13 Drawing Sheets

(56) References Cited

U.S. PATENT DOCUMENTS

| | | | | |
|---|---|---|---|---|
| 5,737,719 | A * | 4/1998 | Terry | G10L 21/0364 |
| | | | | 704/E21.009 |
| 5,749,066 | A * | 5/1998 | Nussbaum | G10L 15/16 |
| | | | | 704/243 |
| 5,832,441 | A * | 11/1998 | Aaron | G10L 21/06 |
| | | | | 704/271 |
| 6,071,123 | A * | 6/2000 | Tallal | G09B 19/04 |
| | | | | 704/E21.009 |
| 9,313,584 | B2 | 4/2016 | Takagi et al. | |
| 9,685,171 | B1 * | 6/2017 | Yang | G10L 21/0208 |
| 9,852,743 | B2 * | 12/2017 | Zhang | G10L 13/10 |
| 11,902,747 | B1 * | 2/2024 | Morris | H04R 25/507 |
| 2004/0230421 | A1 * | 11/2004 | Cezanne | G10L 21/00 |
| | | | | 704/E21.001 |
| 2005/0027537 | A1 | 2/2005 | Krause et al. | |
| 2008/0065381 | A1 * | 3/2008 | Matsumoto | G10L 21/0364 |
| | | | | 704/E21.009 |
| 2012/0215532 | A1 * | 8/2012 | Foo | G10L 21/02 |
| | | | | 704/235 |
| 2013/0156240 | A1 | 6/2013 | Takagi et al. | |
| 2017/0148464 | A1 * | 5/2017 | Zhang | G10L 13/10 |
| 2017/0243582 | A1 * | 8/2017 | Menezes | G10L 13/0335 |
| 2021/0275037 | A1 * | 9/2021 | Shallom | G10L 25/66 |
| 2023/0068099 | A1 * | 3/2023 | Abramenko | G10L 21/0364 |

FOREIGN PATENT DOCUMENTS

| | | |
|---|---|---|
| JP | 2004-004952 A | 1/2004 |
| JP | 2018-036320 A | 3/2018 |
| JP | 2019-213001 A | 12/2019 |
| WO | 2013/008412 A1 | 1/2013 |

* cited by examiner

| PHONEME LABEL | PSYNTHESIZED SPEECH DATA FOR TESTING |
|---|---|
| ⋮ | ⋮ |
| [ka] | S[ka] |
| [ki] | S[ki] |
| [ku] | S[ku] |
| ⋮ | ⋮ |
| [sa] | S[sa] |
| [si] | S[si] |
| ⋮ | ⋮ |

FIG. 2A

| PHONEME LABEL | SYNTHESIZED SPEECH DATA FOR HEARING AID |
|---|---|
| ⋮ | ⋮ |
| [ka] | H[ka] |
| [ki] | H[ki] |
| [ku] | H[ku] |
| ⋮ | ⋮ |
| [sa] | H[sa] |
| [si] | H[si] |
| ⋮ | ⋮ |

FIG. 2B

| PHONEME LABEL | MODIFICATION PROCESSING METHOD |
|---|---|
| ⋮ | ⋮ |
| [ka] | F[ka] |
| [ki] | F[ki] |
| [ku] | F[ku] |
| ⋮ | ⋮ |
| [sa] | F[sa] |
| [si] | F[si] |
| ⋮ | ⋮ |

FIG. 2C

| CONSONANT GROUP | MODIFICATION PROCESSING METHOD |
|---|---|
| (1) VOICELESS CONSONANT | F(1) |
| (1-1) ONSET OF UNVOICED OBSTRUENT IN NARROW DEFINITION | F(1-1) |
| (1-2) VOICELESS PLOSIVE /k, ky, t, p, py/ | F(1-2) |
| (1-3) VOICELESS AFFRICATE /ch, ts/ | F(1-3) |
| (1-4) VOICELESS FRICATIVE /s, sh, h, hy/ | F(1-4) |
| (2) VOICED CONSONANT: ONSET AND PRONUNCIATION OF UNVOICED OBSTRUENT IN BROAD DEFINITION (EXCLUDING UNVOICED OBSTRUENT IN NARROW DEFINITION) | F(2) |
| (2-1) NASAL /n, ny, m, my/ | F(2-1) |
| (2-2) SEMIVOWEL /y, w/ | F(2-2) |
| (2-3) VOICED PLOSIVE /r, ry/ | F(2-3) |
| (3) ONSET OF VOICED OBSTRUENT | F(3) |
| (3-1) VOICED PLOSIVE/VOICED FRICATIVE /d, b, by/ | F(3-1) |
| (3-2) VOICED PLOSIVE/VOICED FRICATIVE /g, gy/ | F(3-2) |
| (3-3) VOICED AFFRICATE/VOICED FRICATIVE /z, j/ | F(3-3) |

FIG. 2D

CORRECTION METHOD OF SYNTHESIZED SPEECH SET FOR HEARING AID

TECHNICAL FIELD

The present invention relates to a correction method of a synthesized speech set for hearing aid.

BACKGROUND ART

Speech synthesis technology, in which input human speech is subjected to text analysis, following which predetermined synthesized speech data is synthesized, thereby artificially creating speech, has conventionally been used. Speech synthesis technology is, for example, used in the field of hearing aids or the like, for assisting hearing of persons with impaired hearing.

For example, Patent Document 1 describes a speech processing device including language processing means that performs analysis of text, a unit database that stores speech in desired synthesis increments, such as vowel/consonant/concatenations of vowel, and a speech synthesis unit that synthesizes speech stored in the unit database on the basis of read information and so forth input by the language processing means. This speech processing device here further includes phonological emphasis processing means that subjects synthesis increments stored in the unit database to emphasis processing, auditory measurement means that measures auditory characteristics of the user, and voice quality control means that decides settings for the emphasis processing on the basis of the measured auditory characteristics. This enables the speech processing device to output synthesized speech in accordance with the auditory characteristics of the user.

CITATION LIST

Patent Document

Patent Document 1: Patent Publication JP-A-2004-004952

SUMMARY

Technical Problem

However, while synthesized speech obtained by emphasis processing does have a higher possibility of being correctly recognized by the user, the user may experience discomfort due to excessive manipulation of amplitude and frequency of original voice waveforms. Synthesized speech systems have developed in the form of (1) waveform system, (2) HMM system, and (3) DNN system, but currently even those of normal hearing may experience confusion in phoneme perception when comparing synthesized speech among companies, due to reasons such as the absence of standards regarding characteristics of consonants and vowels in synthesized speech. It is known that listening among those with impaired hearing in particular has great differences.

Accordingly, it is an object of the present invention to provide a hearing assistance system in which users can recognize correctly and also discomfort is reduced.

Solution to Problem

A method for correcting a synthesized speech set for hearing aid according to an aspect of the present invention is a method for correcting a synthesized speech set for hearing aid in which each of a plurality of phoneme labels is correlated with synthesized speech data for hearing aid for outputting synthesized speech for hearing aid, on the basis of a result of testing using a synthesized speech set for testing in which each of the plurality of phoneme labels is correlated with synthesized speech data for testing for outputting synthesized speech for testing, the method including: outputting first synthesized speech for testing on the basis of first synthesized speech data for testing correlated with a first phoneme label in the synthesized speech set for testing; accepting a first answer selected by a user as a phoneme label perceived to represent the first synthesized speech for testing that is output; outputting second synthesized speech for testing on the basis of second synthesized speech data for testing correlated with a second phoneme label for testing in the synthesized speech set for testing; accepting a second answer selected by the user as a phoneme label perceived to represent the second synthesized speech for testing that is output; and correlating first synthesized speech data for hearing aid correlated with the first phoneme label, with the second phoneme label, instead of second synthesized speech data for hearing aid correlated with the second phoneme label in the synthesized speech set for hearing aid, in a case in which the first answer matches the second phoneme label and also the second answer does not match the second phoneme label.

According to this aspect, even in a case in which the user cannot correctly hear the second synthesized speech for hearing aid output on the basis of the second synthesized speech data for hearing aid correlated with the second phoneme label included in the synthesized speech set for hearing aid, the second synthesized speech data for hearing aid correlated with the second phoneme label in the synthesized speech set for hearing aid can be newly correlated with the first phoneme label, in a case in which the first synthesized speech for testing output on the basis of the first synthesized speech data for testing correlated with other first phoneme label in the synthesized speech set for testing can be recognized as the phoneme that the second phoneme label indicates. Accordingly, the synthesized speech data for hearing aid regarding the synthesized speech set for hearing aid can be corrected so that the user can correctly hear, without necessitating modification processing of the synthesized speech data for hearing aid. Thus, synthesized speech that the user can correctly recognize and regarding which discomfort is reduced can be output.

Advantageous Effects of Invention

According to the present invention, a synthesized speech set for hearing aid that enables output of synthesized speech for hearing aid with reduced discomfort for users can be provided.

BRIEF DESCRIPTION OF DRAWINGS

FIG. 2A is a conceptual diagram showing an example of a data structure of a synthesized speech set for testing.

FIG. 2B is a conceptual diagram showing an example of a data structure of a synthesized speech set for hearing aid.

FIG. 2C is a conceptual diagram showing an example of a data structure of a modification processing method set.

FIG. 2D is a conceptual diagram showing an example of a data structure of the modification processing method set.

DESCRIPTION OF EMBODIMENTS

A preferred embodiment of the present invention will be described with reference to the attached Figures. (Note that in the Figures, parts denoted by the same signs have the same or similar configurations.)

(1) Configuration

Figure 1:
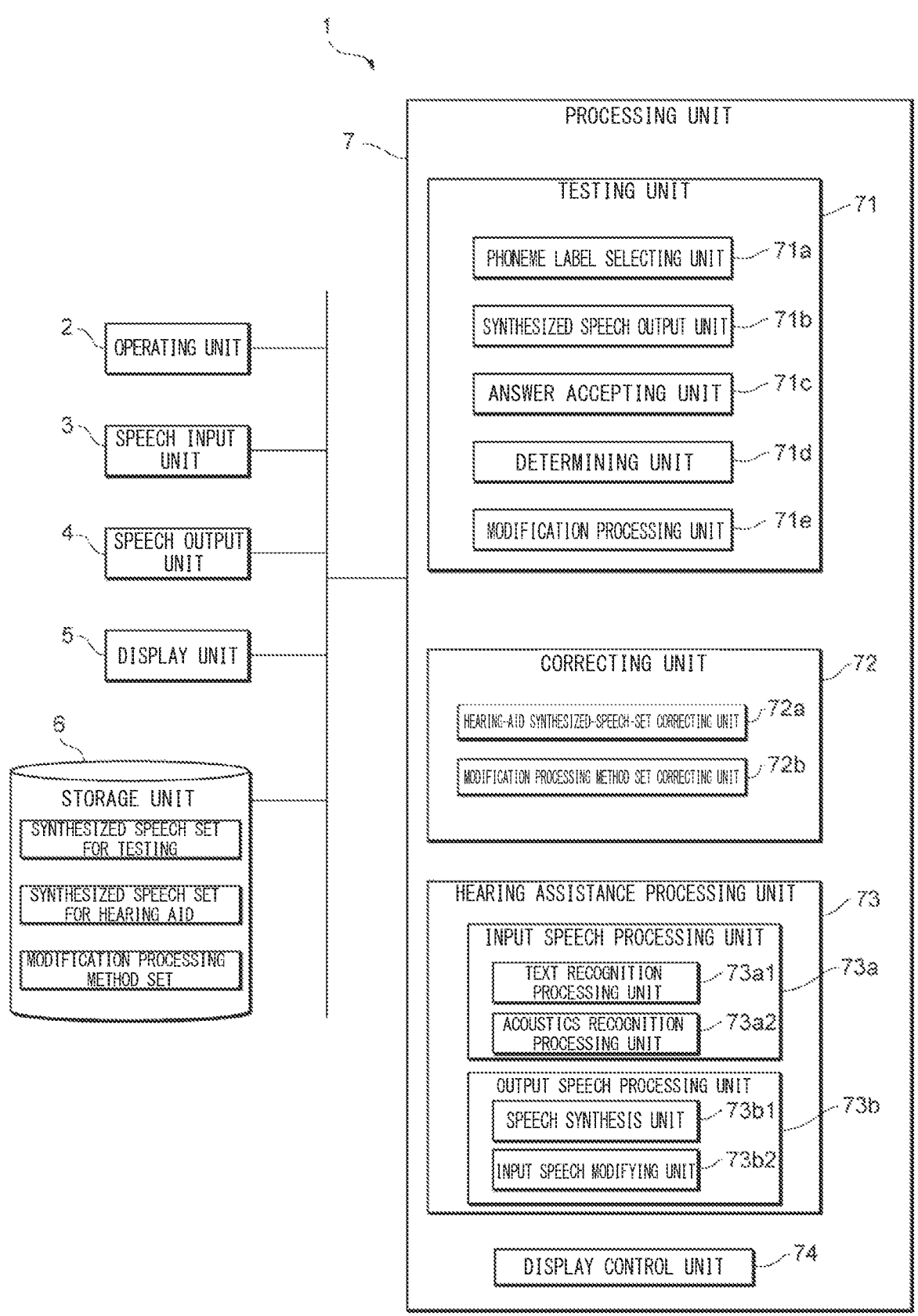
FIG. 1 is a diagram illustrating an example of a configuration of a speech processing device 1 according to an embodiment of the present invention.

FIG. 1 is a diagram illustrating an example of a configuration of a speech processing device 1 according to an embodiment of the present invention. The speech processing device 1 is a device that performs speech output on the basis of input speech (e.g., uttered speech of a speaker) by a synthesized speech system or an input speech modification system. Here, the synthesized speech system is a system in which speech synthesis is performed on the basis of predetermined synthesized speech data. Also, the input speech modification system is a system in which predetermined modification processing is performed on the input speech itself, and speech generated by this modification processing is output.

The speech processing device 1 is capable of correcting a later-described speech synthesis set for hearing aid used in the synthesized speech system in accordance with results of a speech test of a user based on a synthesized speech set for testing, which will be described later. Also, in the same way, the speech processing device 1 is capable of correcting a modification processing method set, which will be described later, used in the input speech modification system in accordance with results of a speech test of a user based on a synthesized speech set for testing.

Note that while the speech processing device 1 is described in the following as being configured of a single information processing device, the speech processing device 1 may be configured as a system by a plurality of information processing devices. The information processing device here may be any sort of information processing device as long as it is an information processing device that can realize the function and the method described in the present disclosure, and may be, for example, a smartphone, a cellular phone (feature phone), a computer, a server device, a handheld computer device, a wearable terminal (e.g., an eyeglasses-type device, a wristwatch-type device, etc.), or any other computer. The information processing device includes, for example, a processor, memory, storage, an input/output interface (input device and output device), and a communication interface, which are connected to each other via a bus.

The speech processing device 1 includes, for example, an operating unit 2, a speech input unit 3, a display unit 5, a speech output unit 4, a storage unit 6, and a processing unit 7, as illustrated in FIG. 1.

The operating unit 2 is configured of, for example, an input device such as a touch panel, key buttons, or the like, accepts operations of a user inputting characters, numerals, symbols, and so forth, and supplies signals corresponding to these operations to the processing unit 7.

The speech input unit 3 is configured of, for example, a microphone or the like, and converts user speech or the like into speech waveforms of electrical signals, which are supplied to the processing unit 7.

The speech output unit 4 is configured of, for example, a speaker or the like, and outputs speech on the basis of synthesized speech data (synthesized speech data for testing, and synthesized speech data for hearing aid, etc.). In particular, the speech output unit 4 outputs synthesized speech for testing on the basis of synthesized speech data for testing, and outputs synthesized speech for modification testing on the basis of synthesized speech data for modification testing. The speech output unit 4 also outputs synthesized speech for hearing aid on the basis of synthesized speech data for hearing aid.

The display unit 5 is configured of, for example, an output device such as a liquid crystal display, an organic EL (Electro Luminescence) display, or the like, and displays images and so forth based on display data supplied from the processing unit 7.

The storage unit 6 includes, for example, storage such as a magnetic tape device, a magnetic disc device, an optical disc device, or the like, and stores computer programs, data, and so forth, used in processing by the processing unit 7. The storage unit 6 also stores synthesized speech sets for testing, synthesized speech sets for hearing aid, and modification processing method sets, which will be described later. Note that the program in the embodiments according to the present disclosure may be provided in a state stored in a computer-readable storage medium. The storage medium is capable of storing programs in a "non-transitory tangible medium". The programs are not limited, and include, for example, software programs and computer programs.

FIG. 2A is a conceptual diagram showing an example of a data structure of a synthesized speech set for testing. In the synthesized speech set for testing, each phoneme label is correlated with synthesized speech data for testing on which synthesized speech for testing is based. In the example illustrated in FIG. 2A, phoneme labels are shown in a column to the left, and synthesized speech data for testing, correlated with the phoneme labels, is shown in a column to the right, respectively. Phoneme labels here are labels for identifying phonemes. Now, phonemes are sounds serving as increments making up speech (do not necessarily have to be a smallest increment), and may be consonants, vowels, combinations of consonants and vowels, and so forth. Phoneme labels may be, for example, phonetic characters (e.g., Japanese kana characters or the like), or may be phonetic script, but is not limited to these. In the present example, phoneme labels are represented by "[ka]" and so forth, and synthesized speech data for testing is represented by "S[ka]"

and so forth. In particular, in the initial state of the synthesized speech set for testing, synthesized speech data for testing for outputting synthesized speech for testing, which a user having normal hearing (unimpaired person) can sufficiently recognize as a sound indicated by the relevant phoneme label, is correlated with each phoneme label.

FIG. 2B is a conceptual diagram showing an example of a data structure of a synthesized speech set for hearing aid. In the synthesized speech set for hearing aid, each phoneme label is correlated with synthesized speech data for hearing aid on which speech synthesis for hearing aid is based. In the example shown in FIG. 2B, phoneme labels are shown in a column to the left, and synthesized speech data for hearing aid, correlated with the phoneme labels, is shown in a column to the right, respectively. At least part of the phoneme labels in the synthesized speech set for hearing aid match at least part of the phoneme labels in the synthesized speech set for testing. The phoneme labels in the synthesized speech set for hearing aid may also completely match the phoneme labels in the synthesized speech set for testing. In the present example, phoneme labels are represented by "[ka]" and so forth, and synthesized speech data for hearing aid is represented by "H[ka]" and so forth. In particular, in the initial state of the synthesized speech set for hearing aid, synthesized speech data for hearing aid for outputting synthesized speech for hearing aid, which a user having normal hearing (unimpaired person) can sufficiently recognize as a sound of the relevant phoneme label, is correlated with each phoneme label.

FIG. 2C is a conceptual diagram showing an example of a data structure of a modification processing method set for each phoneme label. In the example shown in FIG. 2C, a modification processing method to be performed on input speech (e.g., speech of a speaker) is correlated with each phoneme label. In the example shown in FIG. 2C, phoneme labels are shown in a column to the left, and modification processing methods, correlated with the phoneme labels, are shown in a column to the right, respectively. Each of the modification processing methods included in the modification processing method set may be, in initial settings and so forth, minimal modification processing in which emphasis or the like is not performed (including modification processing of outputting the input speech without any change). At least part of the phoneme labels in the modification processing method set match at least part of the phoneme labels in the synthesized speech set for testing. The phoneme labels in the modification processing method set may also completely match the phoneme labels in the synthesized speech set for testing. In the present example, phoneme labels are represented by "[ka]" and so forth, and modification processing methods are represented by "F[ka]" and so forth. In particular, in the initial state of the modification processing method set, minimal modification processing methods for outputting input speech without change (true thereto) is correlated with each phoneme label. Also, in the initial state of the modification processing method set, the modification processing methods for all phoneme labels may be the same as each other.

FIG. 2D is a conceptual diagram showing an example of a data structure of a modification processing method set for each consonant group. In the example shown in FIG. 2D, a modification processing method to be performed on input speech (e.g., speech of a speaker) is correlated with each consonant group. In the example shown in FIG. 2D, consonant groups are shown in a column to the left, and modification processing methods correlated with the consonant groups are shown in a column to the right, respectively.

The consonant groups may, as shown in FIG. 2D, for example, include "(1) voiceless consonant", "(2) voiced consonant", and "(3) onset of voiced obstruent", as general classifications. In the modification processing method set, these consonant groups are respectively correlated with modification processing methods F(1), F(2), and F(3). If "(1) voiceless consonant" is included in the input speech, for example, the modification processing according to the modification processing method F(1) can be performed on the partial speech corresponding to this (1) voiceless consonant of the input speech, using this modification processing method set, for example. Also, "(1) voiceless consonant" may be subdivided into "(1-1) onset of unvoiced obstruent in narrow definition", "(1-2) voiceless plosive/k, ky, t, p, py/", "(1-3) voiceless affricate/ch, ts/", and "(1-4) voiceless fricative/s, sh, h, by/" as subclassifications. Also, "(2) voiced consonant" may be subdivided into "(2-1) nasal/s, sh, h, hy/", "(2-2) semivowel/y, w/", and "(2-3) voiced plosive/r, ry/" as subclassifications. Also, "(3) onset of voiced obstruent" may be subdivided into "(3-1) voiced plosive/voiced fricative/d, b, by/", "(3-2) voiced plosive/voiced fricative/g, gy/", and "(3-3) voiced affricate/voiced fricative/z, j/" as subclassifications. In the modification processing method set, a modification processing method F(1-1) or the like may be provided for each of these subdivided consonant groups. If "(1-1) onset of unvoiced obstruent in narrow definition" is included in the input speech, for example, the modification processing according to the modification processing method F(1-1) can be performed on the partial speech corresponding to the "(1-1) onset of unvoiced obstruent in narrow definition" of the input speech. Note that the method and detail of classification into consonant groups described above in the modification processing method set is an example, and the modification processing method set may be set by other methods and details.

The processing unit 7 includes one or a plurality of processors, and peripheral circuits thereof. The processing unit 7 is, for example, a CPU, and centrally controls overall operations of the speech processing device 1. The processing unit 7 controls operations of the operating unit 2 and so forth, such that various types of processing of the speech processing device 1 are executed according to appropriate procedures, on the basis of programs and the like stored in the storage unit 6. The processing unit 7 executes processing on the basis of computer programs stored in the storage unit 6.

The processing unit 7 includes, for example, a testing unit 71, a correcting unit 72, a hearing assistance processing unit 73, and a display control unit 74. The testing unit 71 includes a phoneme label selecting unit 71a, a synthesized speech output unit 71b, an answer accepting unit 71c, a determining unit 71d, and a modification processing unit 71e. The correcting unit 72 includes a hearing-aid synthesized-speech-set correcting unit 72a and a modification processing method set correcting unit 72b. The hearing assistance processing unit 73 includes an input speech processing unit 73a and an output speech processing unit 73b. The input speech processing unit 73a includes a text recognition processing unit 73a1 and an acoustics recognition processing unit 73a2. The output speech processing unit 73b includes a speech synthesis unit 73b1 and an input speech modifying unit 73b2.

The phoneme label selecting unit 71a selects, in speech testing processing, phoneme labels regarding which testing has not yet ended, for example, out of the synthesized speech set for testing. The synthesized speech output unit 71b controls the speech output unit 4 to output synthesized speech (synthesized speech for testing and synthesized speech for hearing aid, etc.) and synthesized speech for modification testing based on synthesized speech data (synthesized speech data for testing and synthesized speech data for hearing aid, etc.) and synthesized speech data for modification testing. The answer accepting unit 71c accepts answers input by users operating the operating unit 2. Answers include selection of phoneme labels corresponding to output speech and answers to the effect that output speech is unpleasant, for example. The determining unit 71d performs various types of determination in speech testing processing. The modification processing unit 71e performs modification processing of synthesized speech data for testing under predetermined conditions, thereby generating synthesized speech data for modification testing. The hearing-aid synthesized-speech-set correcting unit 72a performs substitution processing and/or modification processing of synthesized speech data for hearing aid correlated with phoneme labels in synthesized speech sets for hearing aid under predetermined conditions. The modification processing method set correcting unit 72b corrects modification processing method sets in accordance with the results of speech testing. The text recognition processing unit 73a1 analyzes input speech and generates text corresponding to the speech, and the acoustics recognition processing unit 73a2 performs acoustics recognition processing on the input speech. Now, acoustics recognition processing is determining acoustical features that input speech has by referencing acoustical features and so forth defined for each consonant group or vowel in advance (may be stored in the storage unit 6 or the like), and distinguishing the consonant group, vowel, or the like corresponding to the speech, for example. The consonant groups may be the consonant groups described with reference to FIG. 2D, for example. The speech synthesis unit 73b1 uses the synthesized speech set for hearing aid to output synthesized speech corresponding to generated text from the speech output unit 4. The input speech modifying unit 73b2 performs modification processing on the speech input using the modification processing method set, and thereafter outputs this speech from the speech output unit 4. The display control unit 74 displays various types of screens and so forth on the display unit 5 on the basis of predetermined display data. A speech analyzing unit 7i analyzes speech input to the speech input unit 3, and generates text data representing the speech. A speech synthesis unit 7j synthesizes speech representing the text data generated by the speech analyzing unit 7i and so forth on the basis of the synthesized speech set for hearing aid, and causes the speech output unit 4 to output the speech.

(2) Operations
(2-1) Speech Testing

Figure 3:
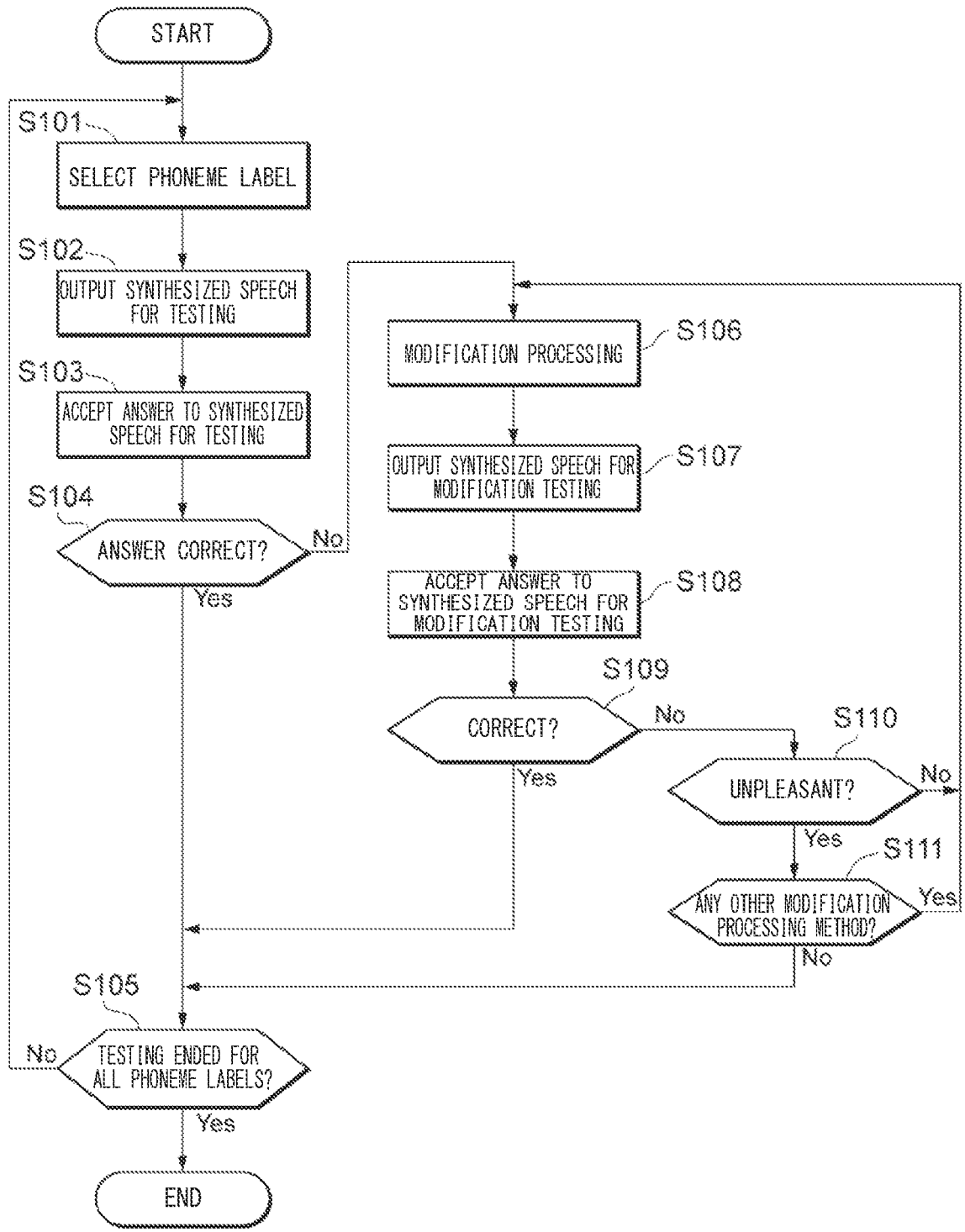
FIG. 3 is an example of an operation flowchart for describing speech testing processing by the speech processing device 1.

FIG. 3 is an example of an operation flowchart for describing speech testing processing by the speech processing device 1. In this processing, the speech processing device 1 outputs synthesized speech for testing or synthesized speech for modification testing, based on a synthesized speech set for testing, and thereupon accepts answers from users.

(S101) First, the phoneme label selecting unit 71a selects an optional phoneme label regarding which testing has not yet ended (phoneme label in testing), out of phoneme labels included in the synthesized speech set for testing stored in the storage unit 6.

(S102) Next, the synthesized speech output unit 7b outputs synthesized speech for testing through the speech output unit 4, on the basis of the synthesized speech data for testing correlated with the phoneme label in testing in the synthesized speech set for testing.

(S103) Next, upon a user selecting a selecting portion for a phoneme label that the user has perceived to represent the speech output in S2 (synthesized speech for testing) from phoneme label selecting portions displayed in a test screen shown in FIG. 5 for example, by operating the operating unit 2, the answer accepting unit 7c accepts this selection as an answer to the synthesized speech for testing. The accepted answer is stored in the storage unit 6, for example.

(S104) Next, the determining unit 7d determines whether or not the answer accepted in S3 is correct. Specifically, the determining unit 7d determines this to be correct if the phoneme label relating to the answer accepted in S3 and the phoneme label in testing are the same, and to be incorrect if different.

(S105) In a case in which the determining unit 7d determines that the answer accepted in S103 is correct (S4; Yes), the determining unit 7d determines whether or not testing has ended for all phoneme labels included in the synthesized speech set for testing.

(S106) In a case in which the determining unit 7d determines that the answer accepted in S103 is incorrect (S4; No), the modification processing unit 7e performs modification processing of the synthesized speech data for testing (the newest synthesized speech data for modification testing however, in a case in which the processing of this S6 has already been performed for the synthesized speech data for testing correlated with the phoneme label in testing), thereby generating synthesized speech data for modification testing.

Note that the modification processing may be one modification processing method selected out of a plurality of modification processing methods in advance. Examples of the plurality of modification processing methods may include, but are not limited to, expanding the sound pressure of consonant phonemes, extending duration time of consonants, inserting silent periods between consonants and vowels, converting the rate of speech, and so forth.

Also, for example, in a case of a user selecting an answer of discomfort regarding modified synthesized speech obtained from synthesized speech data for modification testing generating by going through the modification processing of S106 at least once, which will be described later, the modification processing method used for the modification processing executed again in step S106 may be changed. Also, although the order in which the plurality of modification processing methods is changed can be optionally set, the modification processing methods are preferably changed in the order of, expanding the sound pressure of consonant phonemes, extending duration time of consonants, inserting silent periods between consonants and vowels, and converting the rate of speech, which will be described later, for example. Also, the order of changing the plurality of modification processing methods may be set to be different depending on the type of consonants (plosive consonants (voiced/voiceless), fricative consonants (voiced/voiceless), nasal consonants, etc.).

(S107) Next, the synthesized speech output unit 7b outputs synthesized speech for modification testing through the speech output unit 4, on the basis of the synthesized speech data for modification testing generated in S106.

(S108) Next, the answer accepting unit 7c accepts an answer to the synthesized speech for modification testing output in S107. Specifically, upon a phoneme label perceived to represent the speech output in S7 being selected, the answer accepting unit 7c accepts this selection as an answer. Alternatively, when the user makes a selection to the effect that the synthesized speech for modification testing output in S7 is unpleasant, the answer accepting unit 7c accepts this selection as an answer. The accepted answer is stored in the storage unit 6, for example.

(S109) Next, the determining unit 7d determines whether or not the answer to the synthesized speech for modification testing, accepted in S108, is correct. Specifically, the determining unit 7d determines this to be correct if answer accepted in S8 is selection of a phoneme label, and also the phoneme label relating to the answer and the phoneme label in testing are the same, and to be incorrect if different. In a case in which the determining unit 7d determines that the answer accepted in S108 is correct (S109; Yes), the processing advances to step S105.

(S110) In a case in which the determining unit 7d determines that the answer accepted in S108 is not correct (S109; No), the determining unit 7d determines whether or not an answer has been received to the effect that the synthesized speech for modification testing output in S108 is unpleasant. In a case of determining that no answer to the effect of unpleasant is received (S110; No), the processing advances to S106.

(S111) In a case of the determining unit 7d determining that an answer to the effect that the synthesized speech for modification testing output in S108 is unpleasant is received (S110; Yes), determining unit 7d determines whether or not there is another modification processing method that has not yet been executed out of the plurality of modification processing methods set in advance. In a case of a positive result to the determination (S111; Yes), the processing advances to S106, and in a case of a negative result to the determination (S111; No), the processing advances to S105. This ends the speech testing.

Figure 4:
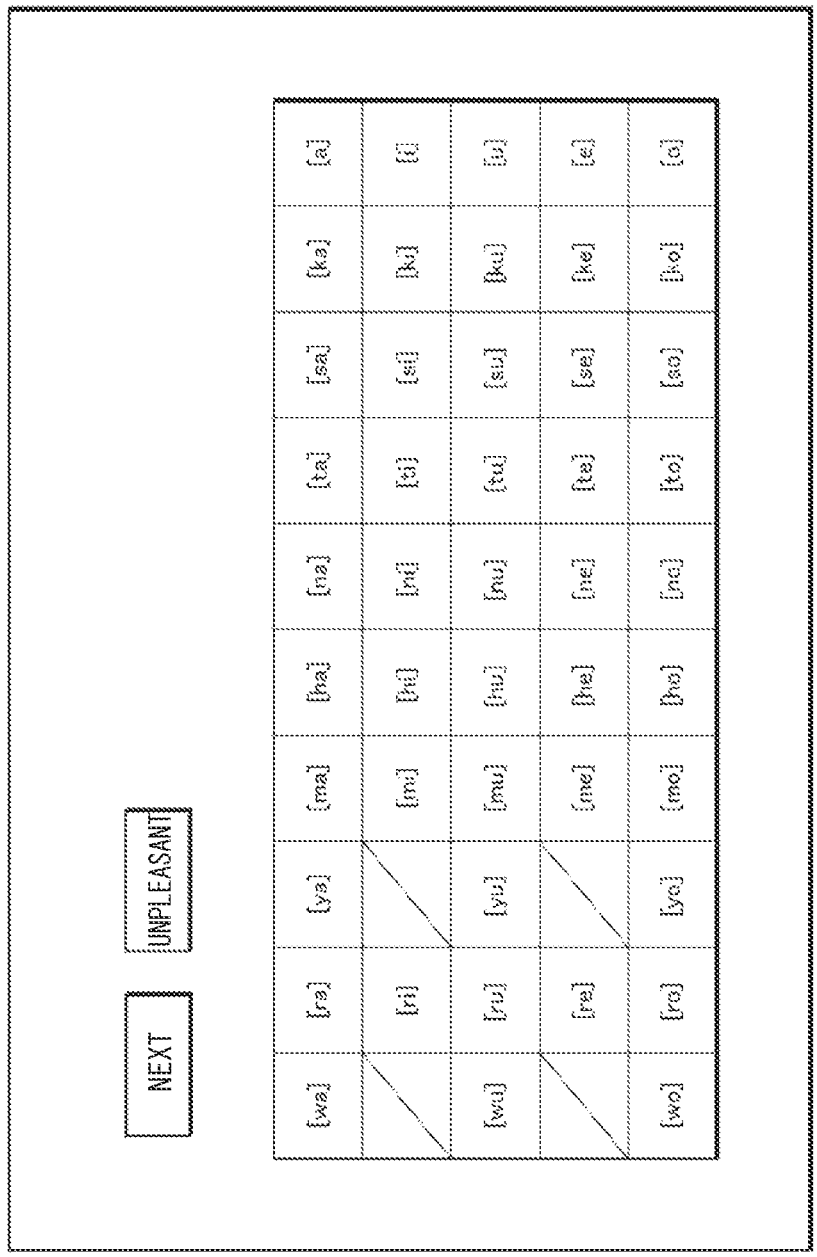
FIG. 4 is a diagram showing an example of a test screen.

FIG. 4 is a diagram showing an example of a test screen displayed on the display unit 5, for example, in the above-described speech testing processing. This test screen is displayed on the display unit 5 by the display control unit 74, on the basis of display data stored in the storage unit 6, for example. As shown in FIG. 4, selecting portions for the phoneme labels included in the synthesized speech set (e.g., [a], [ka], [sa], etc.) are displayed on the test screen. The user can select the selection portions when listening to speech output from the speech output unit 4 and thereafter answering the phoneme label that this speech is perceived to represent. The user can also select a selection portion in which 'unpleasant' is displayed, to answer to the effect that the output speech is unpleasant, either instead of selecting a phoneme label, or along with selecting a phoneme label.

(2-2-1) Correction of Synthesized Speech Set for Hearing Aid

Figure 5A:
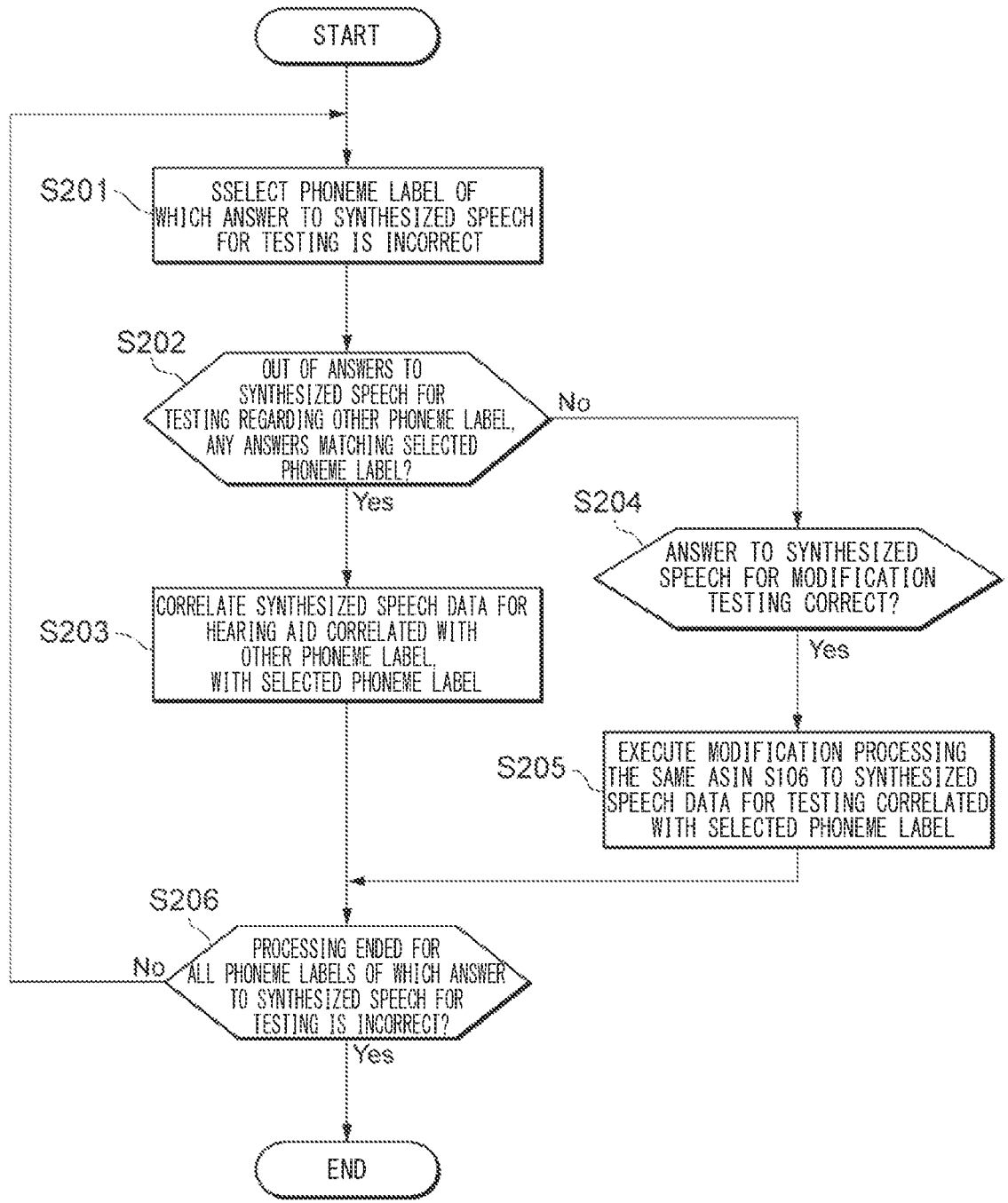
FIG. 5A is a diagram showing an example of an operation flowchart regarding correction processing of the synthesized speech set for hearing aid.

FIG. 5A is a diagram showing an example of an operation flowchart regarding correction processing of the synthesized speech set for hearing aid.

(S201) First, the hearing-aid synthesized-speech-set correcting unit 72a references the storage unit 6 and selects an optional phoneme label regarding which the answer to the synthesized speech for testing accepted in the above-described S103 is incorrect.

(S202) Next, the hearing-aid synthesized-speech-set correcting unit 72a determines whether or not, out of answers to synthesized speech for testing regarding other phoneme labels that differ from the phoneme label selected in S201, there is one that matches the phoneme label selected in S201.

(S203) In a case in which the result of determination in S202 is positive (S202; Yes), the hearing-aid synthesized-speech-set correcting unit 72a newly correlates the synthesized speech data for hearing aid, which is correlated with the other phoneme label in the synthesized speech set for hearing aid, with the phoneme label selected in S201. Thereafter, the processing advances to S206.

(S204) In a case in which the result of determination in S202 is negative (S202; No), the hearing-aid synthesized-speech-set correcting unit 72a determines whether or not the answer to the synthesized speech for modification testing accepted in the above-described S108 is correct.

(S205) In a case in which the answer to the synthesized speech for modification testing accepted in the above-described S108 is determined to be correct (S204; Yes), the hearing-aid synthesized-speech-set correcting unit 72a executes modification processing the same as that in S106 (note however, the processing executed last) as to the synthesized speech data for hearing aid correlated with the phoneme label selected in S201, in the synthesized speech set for hearing aid. The hearing-aid synthesized-speech-set correcting unit 72a then newly correlates the synthesized speech data for hearing aid on which the modification processing has been performed with the phoneme label selected in S201, in the synthesized speech set for hearing aid.

In a case in which the answer to the synthesized speech for modification testing accepted in the above-described S108 is determined to be not correct (S204; No), the processing advances to S206.

(S206) Next, the hearing-aid synthesized-speech-set correcting unit 72a determines whether or not the processing of S201 to S205 has ended for all phoneme labels regarding which the answer to the synthesized speech for testing accepted in the above-described S103 was incorrect. In a case in which the result of determination is positive (S206; Yes), the processing ends, and in a case in which the result of determination is negative (S206; No), the processing advances to S201.

Figure 5B:
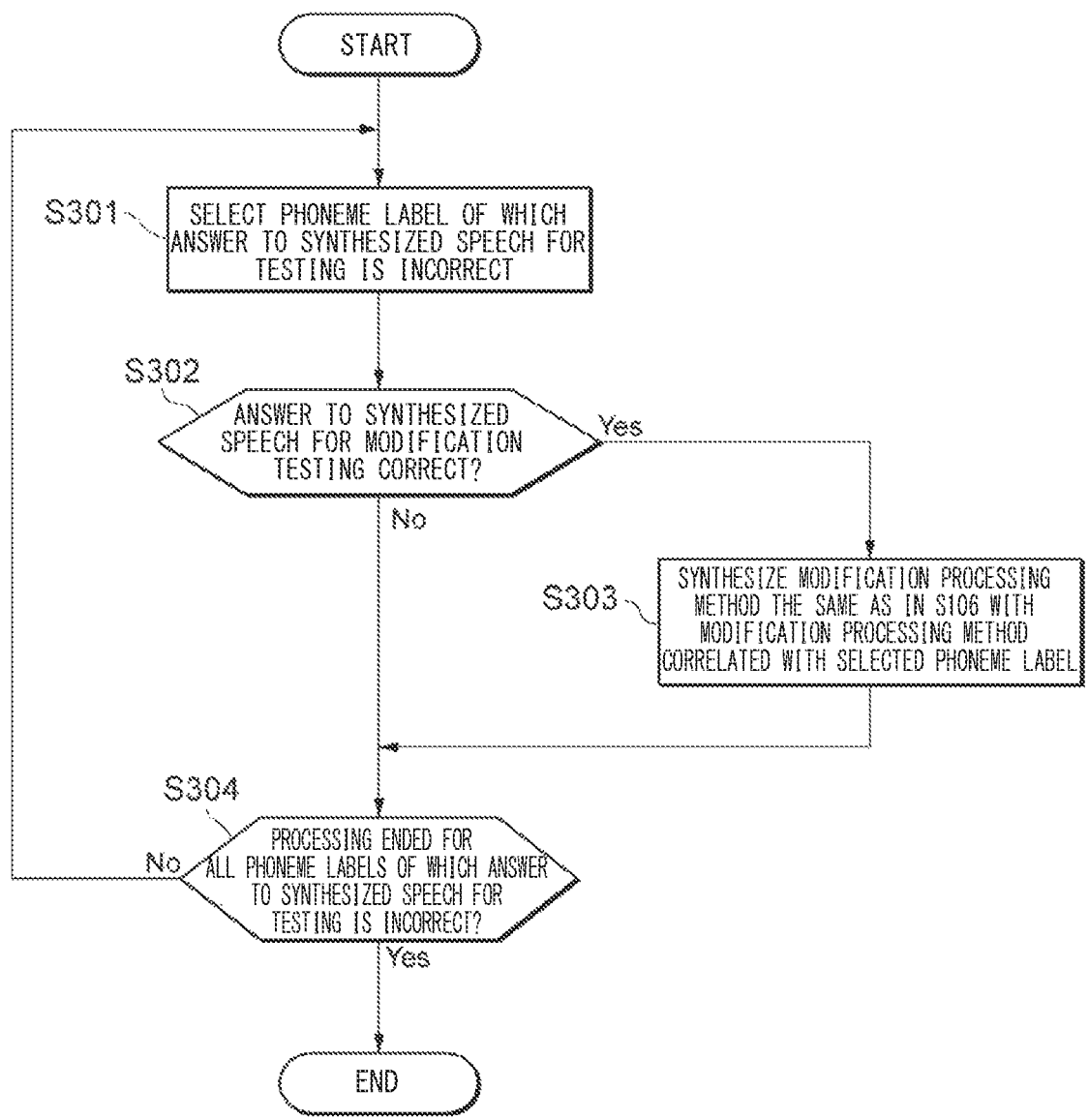
FIG. 5B is a diagram showing an example of an operation flowchart regarding correction processing of the modification processing method set.

(2-2-2-1) Correction of Modification Processing Method Set for Each Phoneme Label FIG. 5B is a diagram showing an example of an operation flowchart regarding correction processing of the modification processing method set, for each phoneme label shown in FIG. 2C.

(S301) First, the modification processing method set correcting 72b references the storage unit 6 and selects an optional phoneme label regarding which the answer to the synthesized speech for testing accepted in the above-described S103 is incorrect.

(S302) The modification processing method set correcting unit 72b determines whether or not the answer to the synthesized speech for modification testing accepted in the above-described S108 is correct, with regard to the phoneme label selected in S301.

(S303) In a case in which the answer to the synthesized speech for modification testing accepted in the above-described S108 is determined to be correct (S302; Yes), the modification processing method set correcting unit 72b performs synthesizing of the modification processing method that is the same as that in S106 (note however, the modification processing method relating to the processing executed last) as to the modification processing method correlated with the phoneme label selected in S301, regarding the modification processing method set of each phoneme label. The modification processing method set correcting unit 72b then newly correlates the new modification processing method that has been synthesized with the phoneme label selected in S301, in the modification processing method set.

(S304) Next, the modification processing method set correcting unit 72*b* determines whether or not the processing of S301 to S303 has ended for all phoneme labels regarding which the answer to the synthesized speech for testing accepted in the above-described S103 was incorrect. In a case in which the result of determination is positive (S304; Yes), the processing ends, and in a case in which the result of determination is negative (S304; No), the processing advances to S201.

(2-2-2-2) Generating Modification Processing Method Set for Each Consonant Group The processing unit 7 can, for example, generate a modification processing method set for each consonant group shown in FIG. 2D, on the basis of answers in the above "(2-1) Speech Testing". For example, the processing unit 7 may generate the modification processing method F(1) corresponding to the "(1) voiceless consonant", on the basis of a plurality of answers to the synthesized speech for testing belonging to "(1) voiceless consonant" in the speech testing. At this time, the degree of modification processing may be strengthened further the greater the number of incorrect answers is. The modification processing may be expanding the sound pressure of consonant phonemes, extending duration time of consonants, inserting silent periods between consonants and vowels, converting the rate of speech, and so forth.

(2-3-1) Hearing Assistance Processing/Synthesized Speech System

Figure 6A:
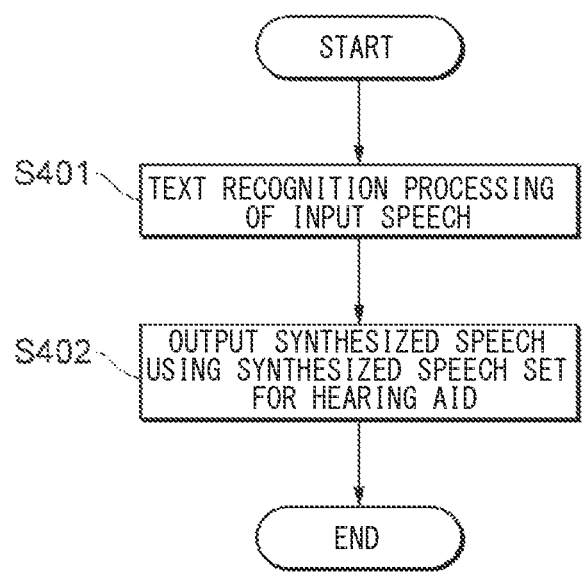
FIG. 6A is a diagram showing an example of an operation flowchart regarding hearing assistance processing by a synthesized speech system.

FIG. 6A is a diagram showing an example of an operation flowchart regarding hearing assistance processing by the synthesized speech system.

(S401) First, upon the speech input unit 3 supplying signals based on speech uttered by a speaker toward the speech input unit 3 to the processing unit 7, the text recognition processing unit 73*a*1 of the input speech processing unit 73*a* performs text recognition processing regarding this speech. This generates text corresponding to each part of the speech that is input.

(S402) Next, the speech synthesis unit 73*b*1 outputs synthesized speech corresponding to the generated text from the speech output unit 4, using the synthesized speech set for hearing aid corrected by the processing of the above "(2-2-1) Correction of Synthesized Speech Set for Hearing Aid", performed with a listener as a subject, for example. Accordingly, the listener can hear synthesized speech based on synthesized speech data that is subjected to substitution processing and/or modification processing as appropriate in accordance with the auditory capability of the listener.

Figure 6B:
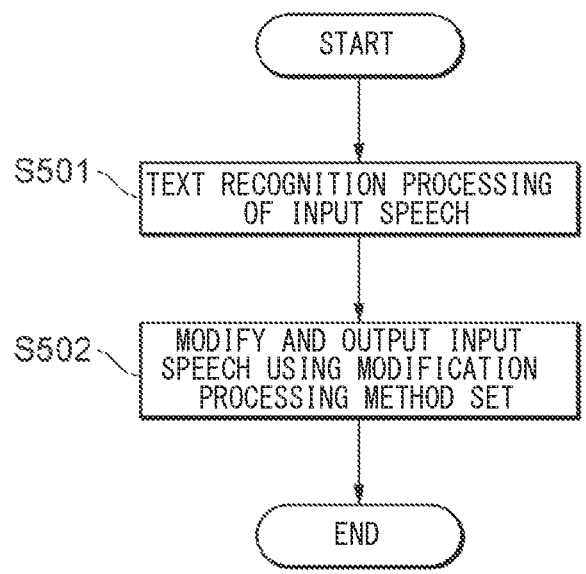
FIG. 6B is a diagram showing an example of an operation flowchart regarding hearing assistance processing by an input speech modification system.

(2-3-2-1) Hearing Assistance Processing/Input Speech Modification Processing System for Each Phoneme Label FIG. 6B is a diagram showing an example of an operation flowchart regarding hearing assistance processing by the input speech modification system.

(S501) First, upon the speech input unit 3 supplying signals based on speech uttered by a speaker toward the speech input unit 3 to the processing unit 7, the text recognition processing unit 73*a*1 of the input speech processing unit 73*a* performs text recognition processing regarding this speech. This generates text corresponding to each part of the speech that is input. Further, the input speech processing unit 73*a* separates words and particles (e.g., "wa", "ga", "wo", etc.) out of the input speech, and thereafter detects consonant portions from these words and particles.

(S502) Next, the input speech modifying unit 73*b*2 of the output speech processing unit 73*b* executes modification processing on each portion of the input speech using the modification processing method set, and controls the speech output unit 4 to output generated speech. At this time, the input speech modifying unit 73*b*2 may execute different modification processing for each phoneme label included in the input speech, using the modification processing method sets for each phoneme label, shown in FIG. 2C, for example. Alternatively, for example, the input speech modifying unit 73*b*2 may identify consonant groups corresponding to the phoneme labels included in the input speech using the modification processing method sets for each consonant group, shown in FIG. 2D, and thereafter execute modification processing by the modification processing methods corresponding to the identified consonant groups. Alternatively, the input speech modifying unit 73*b*2 may execute modification processing of only the first consonant of each word, by the modification processing method corresponding to the consonant group to which that consonant belongs, for example. Specifically, in the word "kamihikouki" for example, "ka", "mi", "hi", "ko", and "ki" are consonants. In this case, modification processing may be executed on just the first consonant "ka", by the modification processing method corresponding to the consonant group to which the consonant "ka" belongs. Accordingly, the comprehension of the listener often improves, without making the length of the entire word excessively long.

Figure 6C:
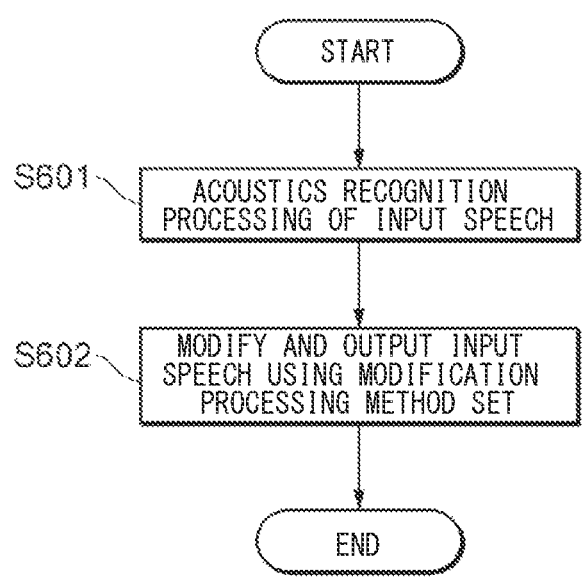
FIG. 6C is a diagram showing another example of an operation flowchart regarding the hearing assistance processing by the input speech modification system.

(2-3-2-2) Hearing Assistance Processing/Input Speech Modification Processing System for Each Consonant Group FIG. 6C is a diagram showing another example of an operation flowchart regarding hearing assistance processing by the input speech modification system.

(S601) First, upon the speech input unit 3 supplying signals based on speech uttered by a speaker toward the speech input unit 3 to the processing unit 7, the acoustics recognition processing unit 73*a*2 of the input speech processing unit 73*a* performs acoustic processing on this speech, and thereby distinguishes consonant groups included in the input speech, on the basis of acoustical features of the speech. This acoustical processing takes advantage of the fact that acoustical characteristics of consonants belonging to the same consonant group are similar, and for example, whether or not this speech is a sound belonging to this consonant group may be determined by whether or not the difference between a spectrum or the like defined in advance for each consonant group and the input speech spectrum or the like is within a predetermined threshold value. Alternatively, a speech waveform may be converted into frequency domain, following which Bayesian inference is used to detect fricative-like phonological sounds, plosive-like phonological sounds, nasal-like phonological sounds, and vowel-like phonological sounds. Accordingly, consonant groups are generated corresponding to each part of the speech.

(S602) Next, the input speech modifying unit 73*b*2 of the output speech processing unit 73*b* performs modification processing, correlated with this consonant group in the modification processing method set, on the partial speech corresponding to the predetermined consonant group of the input speech, using the modification processing method set for each consonant group shown in FIG. 2D, and controls the speech output unit 4 to output generated speech. Thus, modification processing is performed on input speech of the speaker by the modification processing method for each consonant group, and thereafter the input speech on which modification processing has been performed is output.

The embodiment described above is for facilitating understanding of the present invention, and is not for restrictively interpreting the present invention. The components included in the embodiment, and the layouts, materials, conditions, shapes, sizes and so forth, thereof are not limited to those exemplified, and can be changed as appropriate. Also, configurations shown in different embodiments may be partially exchanged or combined with each other.

(3) Others

In another embodiment of the present invention, a speech testing device 1A and a hearing aid 1B may be configured as separate information processing devices. Configuring the speech testing device 1A and the hearing aid 1B as separate information processing devices in this way is advantageous in that the size of the hearing aid 1B can be reduced. In particular, acoustical analysis of input speech is performed in various embodiments of the present embodiment, and accordingly the capacity of the hearing aid 1B can be reduced.

Figure 7:
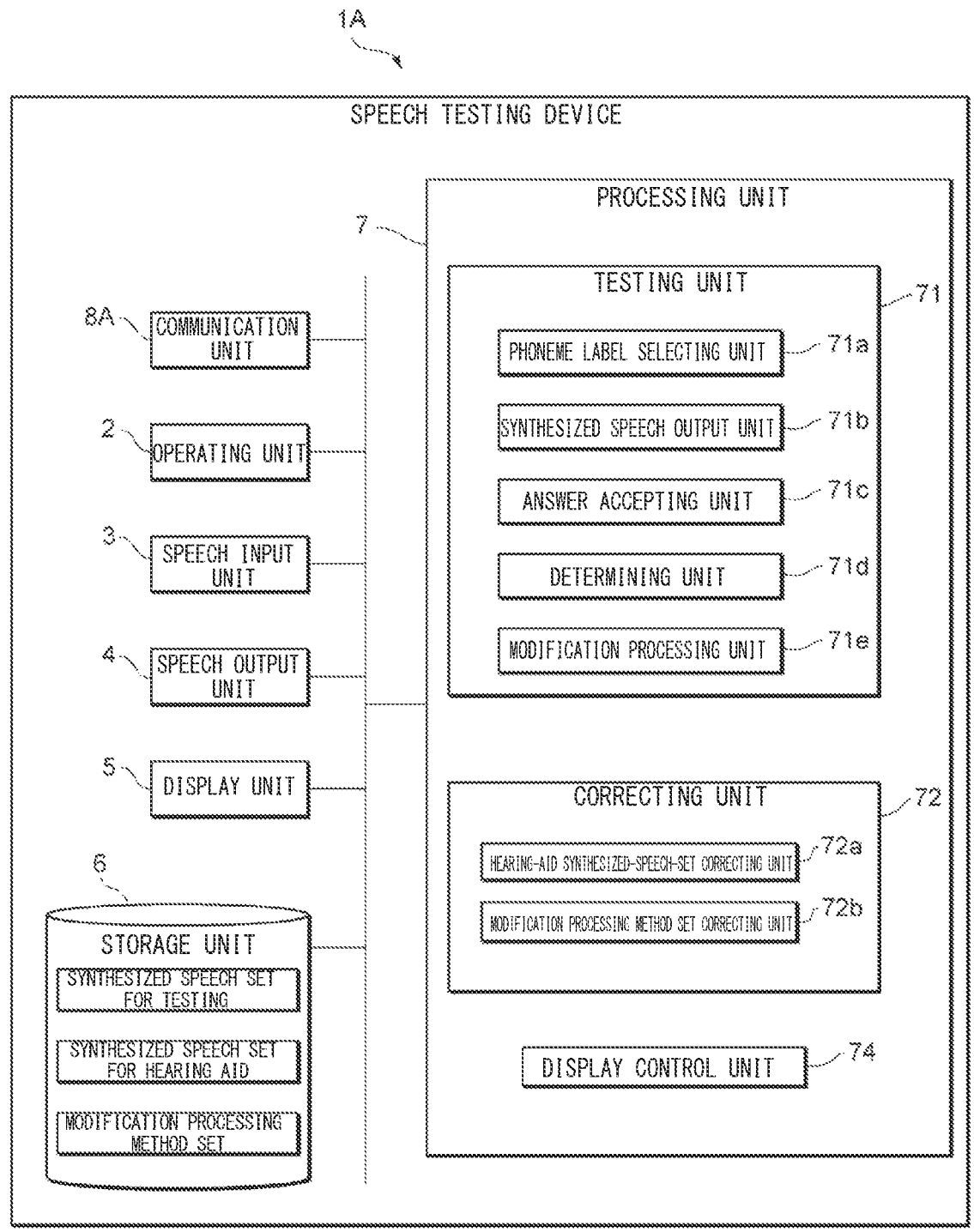
FIG. 7 is a diagram illustrating an example of a configuration of a speech testing device 1A according to another embodiment of the present invention.

FIG. 7 is a diagram illustrating an example of a configuration of the speech testing device 1A according to another embodiment of the present invention. The speech testing device 1A may be configured as an optional information processing device, such as, for example, a personal computer (PC), a smartphone, a tablet terminal, a dedicated terminal, or the like. The speech testing device 1A includes, for example, the operating unit 2, the speech input unit 3, the speech output unit 4, the display unit 5, the storage unit 6, and the processing unit 7. The processing unit 7 includes, for example, the testing unit 71, the correcting unit 72, and the display control unit 74.

The speech testing device 1A further includes a communication unit 8A, for example. The communication unit 8A here has a communication interface circuit for connecting the speech testing device 1A to other information processing devices such as the hearing aid 1B and so forth, by near-field communication or optional mobile communication or the like, such as Bluetooth (registered trademark) or the like. The communication unit 8A supplies data received from an information processing device such as the hearing aid 1B or the like to the processing unit 7. The communication unit 8A also transmits data supplied from the processing unit 7 to the hearing aid 1B and so forth.

Figure 8:
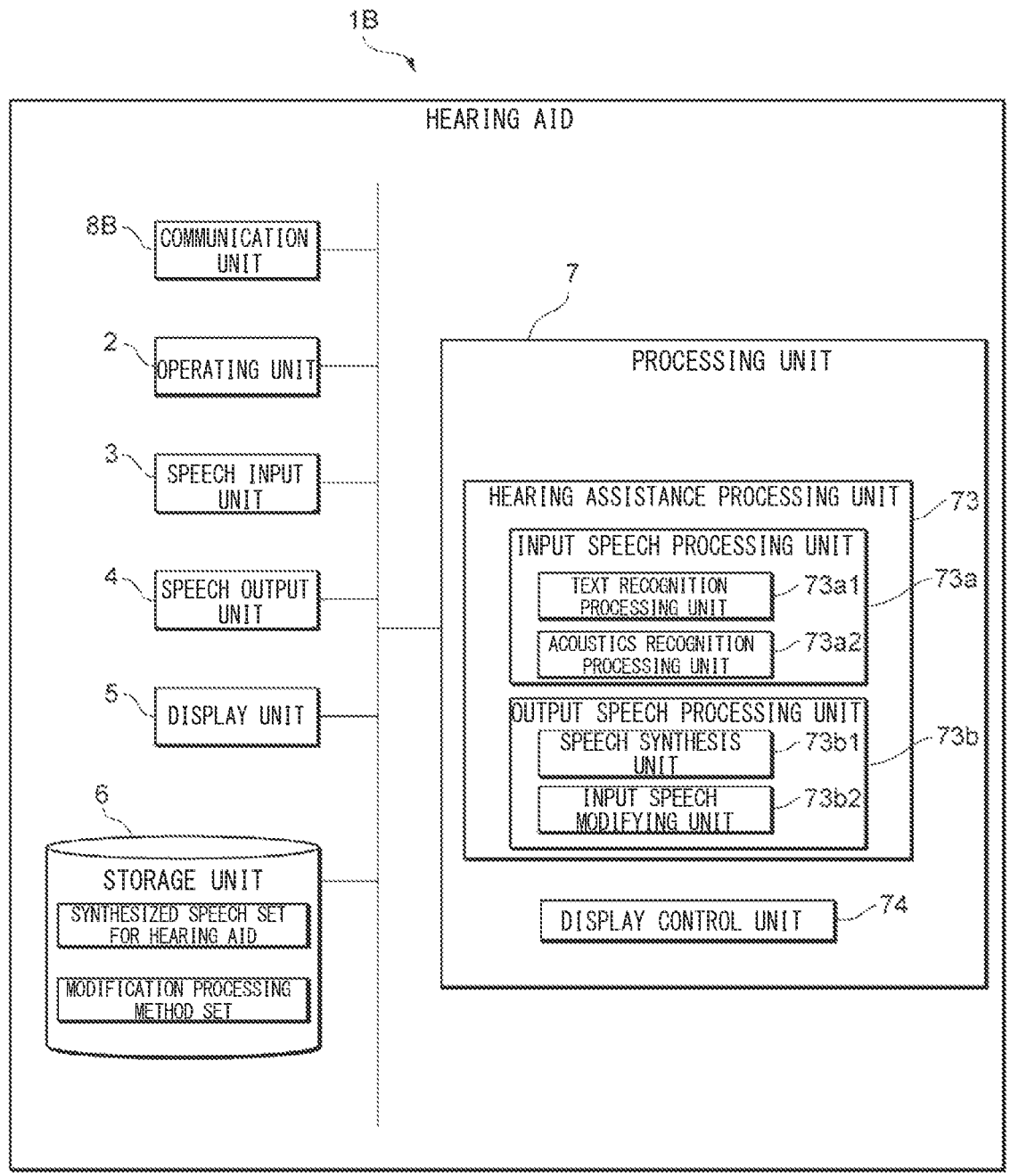
FIG. 8 is a diagram illustrating an example of a configuration of a hearing aid 1B according to another embodiment of the present invention.

FIG. 8 is a diagram illustrating an example of a configuration of the hearing aid 1B according to another embodiment of the present invention. The hearing aid 1B may be configured as an optional information processing device, such as, for example, a personal computer (PC), a smartphone, a tablet terminal, a dedicated terminal, or the like. The hearing aid 1B includes, for example, the operating unit 2, the speech input unit 3, the speech output unit 4, the display unit 5, the storage unit 6, and the processing unit 7. The processing unit 7 includes, for example, the hearing assistance processing unit 73 and the display control unit 74. The storage unit 6 stores the synthesized speech set for hearing aid and the modification processing method set.

The hearing aid 1B further includes a communication unit 8B, for example. The communication unit 8A here has a communication interface circuit for connecting the hearing aid 1B to other information processing devices such as the speech testing device 1A and so forth, by near-field communication or optional mobile communication or the like, such as Bluetooth (registered trademark) or the like. The communication unit 8A supplies data received from an information processing device such as the speech testing device 1A or the like to the processing unit 7. The communication unit 8A also transmits data supplied from the processing unit 7 to the speech testing device 1A and so forth.

In yet another embodiment of the present invention, the speech testing device 1A may, upon detecting speech of a subject and performing comparison with each of a plurality of model speeches defined in advance, thereafter decide the degree of overall fine correction of speech synthesis or enhancement modification, instead of for each of individual phoneme labels or consonant groups.

REFERENCE SIGNS LIST

1 Speech processing device
2 Operating unit
3 Speech input unit
4 Speech output unit
4 Display unit
6 Storage unit
7 Processing unit
7a Phoneme label selecting unit
7b Synthesized speech output unit
7c Answer accepting unit
7d Determining unit
7e Modification processing unit
7f Hearing-aid synthesized-speech-set correcting unit
7g Substitution processing unit
74 Display control unit
7i Speech analyzing unit
7j Speech synthesis unit
1A Speech testing device
1B Hearing aid

The invention claimed is:

1. A method for correcting a synthesized speech set for hearing aid in which each of a plurality of phoneme labels is correlated with synthesized speech data for hearing aid for outputting synthesized speech for hearing aid, on the basis of a result of testing using a synthesized speech set for testing in which each of the plurality of phoneme labels is correlated with synthesized speech data for testing for outputting synthesized speech for testing, the method comprising the steps of:

outputting first synthesized speech for testing on the basis of first synthesized speech data for testing correlated with a first phoneme label in the synthesized speech set for testing;

accepting a first answer selected by a user as a phoneme label perceived to represent the first synthesized speech for testing that is output;

outputting second synthesized speech for testing on the basis of second synthesized speech data for testing correlated with a second phoneme label in the synthesized speech set for testing;

accepting a second answer selected by the user as a phoneme label perceived to represent the second synthesized speech for testing that is output; and correlating first synthesized speech data for hearing aid correlated with the first phoneme label, with the second phoneme label, instead of second synthesized speech data for hearing aid correlated with the second phoneme label in the synthesized speech set for hearing aid, in a case in which the first answer matches the second phoneme label and also the second answer does not match the second phoneme label.

2. The method according to claim 1, further comprising the steps of:

outputting synthesized speech for modification testing on the basis of synthesized speech data for modification testing that is obtained by modification processing of the second synthesized speech data for testing;

accepting a third answer selected by the user as a phoneme label perceived to represent the synthesized speech for modification testing that is output; and performing same modification processing as the modification processing, on the second synthesized speech data for hearing aid correlated with the second phoneme label in the synthesized speech set for hearing aid, in a case in which the third answer matches the second phoneme label.

3. The method according to claim 2, wherein
the modification processing includes at least one of expanding consonant phonemes, extending duration time of consonants, inserting silent periods between consonants and vowels, and converting a rate of speech, of the synthesized speech data for testing.

4. The method according to claim 2, further comprising the steps of:

accepting a fourth answer to the effect that the output synthesized speech for modification testing is unpleasant; and correlating the first synthesized speech data for hearing aid with the second phoneme label instead of the second synthesized speech data for hearing aid in the synthesized speech set for hearing aid, in a case in which the first answer matches the second phoneme label, the second answer does not match the second phoneme label, and the fourth answer is accepted.

5. The method according to claim 1, wherein
the phoneme label indicates one of a consonant phoneme, a vowel phoneme, and a combined phoneme of a consonant and vowel.

6. A hearing assistance method, comprising the steps of:
accepting input of speech;
generating text by analyzing the speech; and
outputting speech on the basis of synthesized speech data correlated with a phoneme label corresponding to the generated text in a synthesized speech set corrected by the method of claim 1 that corresponds to the generated text.

7. A method for correcting a modification processing method set defining modification processing to be performed to a portion of input speech that corresponds to a predetermined sound label out of input speech, on the basis of a result of testing using a synthesized speech set for testing in which each of a plurality of phoneme labels is correlated with synthesized speech data for testing for outputting synthesized speech for testing, the method comprising the steps of:

outputting synthesized speech for testing on the basis of synthesized speech data for testing correlated with a first phoneme label in the synthesized speech set for testing;

accepting a first answer selected by a user as a phoneme label perceived to represent the synthesized speech for testing that is output;

outputting synthesized speech for modification testing on the basis of synthesized speech data for modification testing obtained by performing modification processing by a predetermined modification processing method on synthesized speech data for testing that is correlated with the first phoneme label in the synthesized speech set for testing;

accepting a second answer selected by the user as a phoneme label perceived to represent the synthesized speech for modification testing that is output; and synthesizing the predetermined modification processing method with modification processing which, in the modification processing method set, correlated with the first phoneme label, in a case in which the first answer does not match the first phoneme label and also the second answer matches the first phoneme label.

8. A hearing assistance method, comprising the steps of:
accepting input of speech uttered by a speaker;
analyzing the speech uttered by the speaker;
performing modification processing by a predetermined modification processing method on the speech uttered by the speaker, in accordance with a result of analyzing the speech uttered by the speaker; and
outputting the speech on which modification processing has been performed,
wherein the predetermined modification processing method is included in the modification processing method set corrected by the method according to claim 7.

9. The hearing assistance method according to claim 8, wherein,
in the analyzing of the speech uttered by the speaker, analysis for emphasizing a characteristic of the speech uttered by the speaker is executed, rather than analysis for mitigating ambient noise intermingled in the speech uttered by the speaker.

10. The hearing assistance method according to claim 8, wherein,
in the analyzing of the speech uttered by the speaker, a consonant group indicating a characteristic of a consonant in the speech uttered by the speaker is distinguished by performing acoustic analysis processing of the speech uttered by the speaker, and
in the performing of modification processing of the speech uttered by the speaker, modification processing of the speech uttered by the speaker is performed by a predetermined modification processing method that is in the modification processing method set and that corresponds to the consonant group.

11. The hearing assistance method according to claim 8, wherein,
in the analyzing of the speech uttered by the speaker, text corresponding to the speech uttered by the speaker is distinguished by performing text recognition processing of the speech, and
in the performing of modification processing of the speech uttered by the speaker, modification processing of the speech uttered by the speaker is performed by a predetermined modification processing method that is in the modification processing method set and that corresponds to the text.

12. A hearing assistance method, comprising the steps of:
accepting input of speech uttered by a speaker;
analyzing the speech uttered by the speaker;
performing modification processing by a predetermined modification processing method on the speech uttered by the speaker, in accordance with a result of analyzing the speech uttered by the speaker; and
outputting the speech on which modification processing has been performed;
wherein,
in the performing of modification processing of the speech uttered by the speaker, modification processing is performed on the speech uttered by the speaker by a predetermined modification processing method included in the modification processing method set corrected by the method according to claim 7.

13. A hearing assistance method, comprising the steps of:

accepting input of speech uttered by a speaker;

analyzing the speech uttered by the speaker;

performing modification processing by a predetermined modification processing method on the speech uttered by the speaker, in accordance with a result of analyzing the speech uttered by the speaker; and outputting the speech on which modification processing has been performed, wherein, in the analyzing of the speech uttered by the speaker, text corresponding to the speech uttered by the speaker is distinguished by performing text recognition processing of the speech, and wherein, in the performing of modification processing of the speech uttered by the speaker, modification processing of the speech uttered by the speaker is performed by a predetermined modification processing method corresponding to the text.

* * * * *